(12) United States Patent
Scharp et al.

(10) Patent No.: US 8,671,905 B2
(45) Date of Patent: Mar. 18, 2014

(54) PISTON FOR AN INTERNAL COMBUSTION ENGINE AND METHOD FOR ITS PRODUCTION

(75) Inventors: Rainer Scharp, Vaihingen (DE); Peter Kemnitz, Leutenbach (DE); Michael Ullrich, Moeglingen (DE)

(73) Assignee: MAHLE International GmbH, Stuttgart (DE)

( * ) Notice: Subject to any disclaimer, the term of this patent is extended or adjusted under 35 U.S.C. 154(b) by 132 days.

(21) Appl. No.: 13/225,663

(22) Filed: Sep. 6, 2011

(65) Prior Publication Data

US 2013/0014722 A1   Jan. 17, 2013

(30) Foreign Application Priority Data

Jul. 12, 2011   (DE) .......................... 10 2011 107 655

(51) Int. Cl.
*F02F 3/00* (2006.01)
*F16J 1/00* (2006.01)

(52) U.S. Cl.
USPC .................................... 123/193.6; 123/41.35

(58) Field of Classification Search
USPC ........... 123/193.6, 41.35; 92/187; 29/888.043
See application file for complete search history.

(56) References Cited

U.S. PATENT DOCUMENTS

| | | | |
|---|---|---|---|
| 3,914,574 A | 10/1975 | Hill et al. | |
| 4,553,472 A | 11/1985 | Munro et al. | |
| 4,746,582 A | 5/1988 | Tsuno | |
| 4,838,149 A | 6/1989 | Donnison et al. | |
| 5,071,968 A * | 12/1991 | Walter | 534/768 |
| 6,279,455 B1 * | 8/2001 | Kruse | 92/186 |
| 6,401,680 B1 * | 6/2002 | Zhu et al. | 123/193.6 |
| 2009/0002007 A1 * | 1/2009 | Schubring et al. | 324/755 |
| 2012/0080004 A1 * | 4/2012 | Menezes et al. | 123/193.6 |

FOREIGN PATENT DOCUMENTS

DE   30 32 671   3/1982

\* cited by examiner

*Primary Examiner* — M. McMahon
(74) *Attorney, Agent, or Firm* — Collard & Roe, P.C.

(57) ABSTRACT

A piston for an internal combustion engine has a piston head that has a circumferential cooling channel as well as a combustion bowl having a circumferential bowl wall that makes a transition into a piston crown by way of a bowl edge region. The combustion bowl is formed at least in part by a piston base body and the bowl wall is formed at least in part from an insert. The insert is connected with the piston base body by means of beam welding. A lower weld seam is configured in the bowl wall, which seam encloses an acute angle with the piston center axis (M) and ends in the lower half of the cooling channel. An upper weld seam runs from the cooling channel ceiling to the piston crown and is disposed centered or radially offset toward the outside, with reference to the clear width of the cooling channel.

10 Claims, 2 Drawing Sheets

PISTON FOR AN INTERNAL COMBUSTION ENGINE AND METHOD FOR ITS PRODUCTION

CROSS REFERENCE TO RELATED APPLICATIONS

Applicants claim priority under 35 U.S.C. §119 of German Application No. 10 2011 107 655.0 filed Jul. 12, 2011, the disclosure of which is incorporated by reference.

BACKGROUND OF THE INVENTION

1. Field of the Invention

The present invention relates to a piston for an internal combustion engine, having a piston head that has a circumferential cooling channel as well as a combustion bowl having a circumferential bowl wall that makes a transition into a piston crown by way of a bowl edge region. The combustion bowl is formed at least in part by a piston base body, and the bowl wall is formed at least in part from an insert. The present invention furthermore relates to a method for the production of such a piston.

2. The Prior Art

A piston of this type is described in German Patent Application No. DE 30 32 671 A1. It has a piston base body made of a flow-pressed steel and an insert welded or soldered to the piston base body, made of a highly heat-resistant material. The piston base body is provided with a combustion bowl in the region of the piston head, which bowl is delimited by a circumferential bowl wall that makes a transition into the piston crown by way of the bowl edge region. The piston base body and the insert form a circumferential cooling channel.

The bowl wall and, in particular, the bowl edge region are subject to particularly great mechanical and thermal stresses during operation, which stresses lead to material fatigue over the course of time, which in turn can cause cracks to form. For this reason, inserts structured in numerous ways have been proposed, in order to reduce or neutralize the stresses that act on the bowl edge region. Because of the further development of engine technology, these suggestions are no longer able to keep pace with the increased mechanical and thermal stresses on pistons during engine operation.

SUMMARY OF THE INVENTION

It is therefore an object of the present invention to provide a piston of this type and a method for its production, in such a manner that it withstands the increased mechanical and thermal stresses.

This object is accomplished in that an insert is connected with the piston base body by means of beam welding, and a lower weld seam is configured in the bowl wall. This seam encloses an acute angle with the piston center axis and ends in the lower half of the cooling channel. An upper weld seam runs from the cooling channel ceiling to the piston crown and is disposed centered or radially offset toward the outside, with reference to the clear width of the cooling channel.

The method according to the invention has the following method steps: a) pre-working the piston base body and the insert, at least in the region of the joining surfaces; b) assembling piston base body and insert; c) connecting piston base body and insert along their corresponding joining surfaces, by means of beam welding; d) machining the piston to finish it.

The piston according to the invention withstands great thermal and mechanical stresses very well, because the connection of piston base body and insert by means of beam welding is particularly strong and resistant. Furthermore, the weld seams are disposed in those regions of the piston head in which only slight stresses occur in the material, on the basis of the thermal and mechanical stresses during engine operation, so that the risk of crack formation in the region of the weld seams is minimized. The location of the joining surfaces of piston base body and insert is furthermore selected in such a manner that they are easily accessible for beam welding, so that the location of the resulting weld seams is optimized.

Advantageous further developments are evident from the dependent claims.

Particularly preferably, the piston base body and the insert are connected with one another by means of laser welding, in order to obtain a particularly strong and reliable connection between these components.

The lower weld seam and the upper weld seam preferably enclose an acute angle, so that the corresponding joining surfaces are particularly easily accessible before piston base body and insert are connected.

In one embodiment, the lower weld seam ends in the cooling channel in the region of the cooling channel bottom. In this region, the lowest stresses in the material occur during engine operation, so that the risk of crack formation in the region of the lower weld seam is minimized.

The lower weld seam preferably has a length of 3.5% to 5.5% of the piston diameter. The upper weld seam preferably runs parallel to the piston center axis, and preferably has a length of 4.5% to 6.0% of the piston diameter.

In a preferred embodiment of the present invention, the thickness of the piston crown increases radially toward the outside, above the cooling channel. As a result, heat dispersion by way of the first piston ring is promoted.

In one embodiment which is particularly effective, the insert forms the entire bowl wall. The piston base body and the insert preferably consist of different materials. Then, identical piston base bodies can be processed for use for different piston types for a great number of different internal combustion engines, simply by the selection of the suitable material for the insert.

It is practical if the insert consists of a steel that is resistant to high elevated temperatures, corrosion-resistant, and heat-resistant, particularly of a valve steel. In contrast to this, the piston base body can consist of an annealed steel, for example.

In one embodiment of the method, the joining surfaces of piston base body and insert are cleaned and smoothed in step a), in order to obtain particularly strong and reliable weld seams. Subsequent to this, in step b), the piston base body and the insert can be assembled by a press fit and/or by tacking, in order to fix the components in place, relative to one another, in a particularly reliable manner during the actual welding process.

The piston base body and the insert are preferably connected with one another by electron beam welding, particularly preferably by laser welding. Before the welding process, the piston base body and/or the insert can be preheated to 400° C. to 550° C., in order to reduce the risk of stresses in the material due to thermal stress during the welding process.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
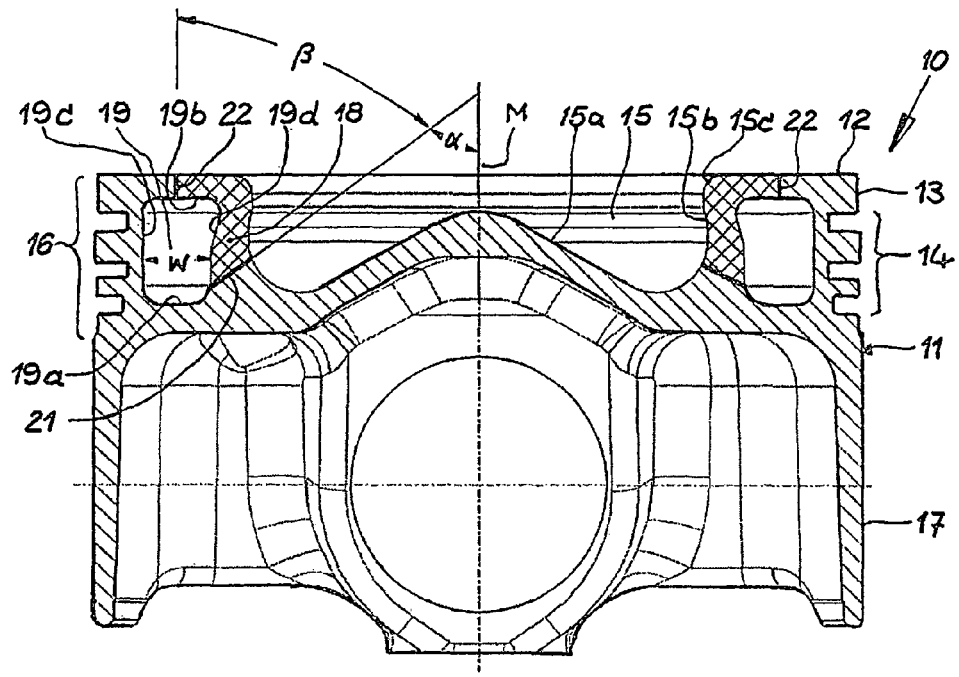
FIG. 1 shows a sectional view of a first embodiment of a piston according to the invention.
Figure 2:
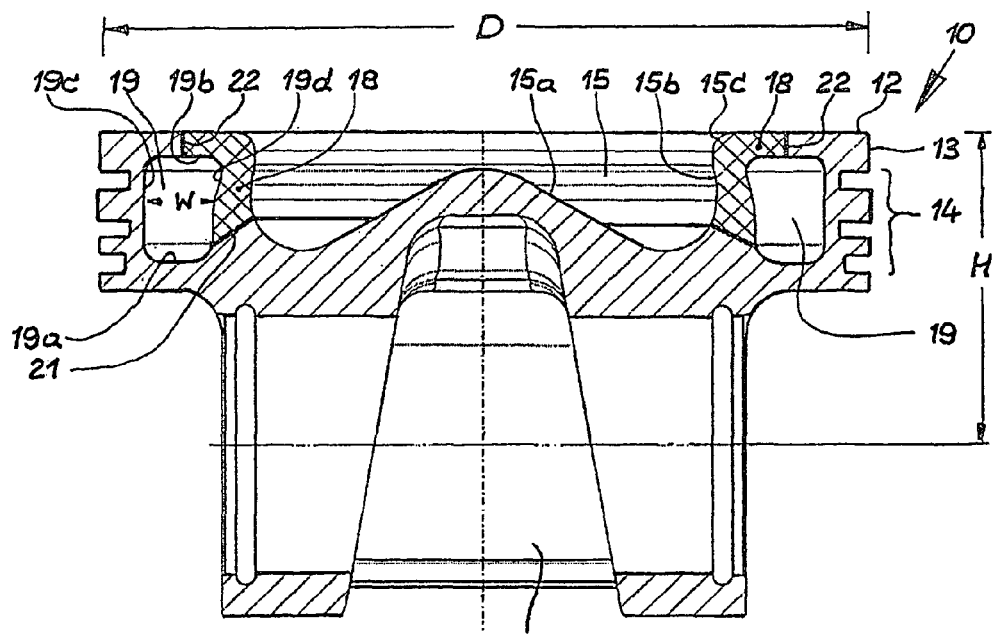
FIG. 2 shows the piston according to FIG. 1 in a representation rotated by 90°.

Referring now in detail to the drawings, FIGS. 1 and 2 show a first embodiment of a piston 10 according to the invention. Piston 10 has a piston base body 11, which is produced, for example, from an annealed steel such as 42CrMo4, for example, or an AFP steel or a bainitic AFP steel doped with 0.4 wt.-% molybdenum. The piston base body 11 has a part of a piston crown 12, a circumferential top land 13, as well as a circumferential ring belt 14 having ring grooves for accommodating piston rings (not shown). Piston base body 11 furthermore has the bottom 15a of a combustion bowl 15. Piston base body 11 thus forms an essential part of piston head 16 of piston 10. Piston base body 11 furthermore forms piston skirt 17 of piston 10 according to the invention, in known manner. The compression height KH of piston 10, defined as the ratio of the height H of the piston 10 (measured from the center of the pin bore to the piston crown) to diameter D of the piston 10, amounts to 38% to 45% in this embodiment.

The piston according to the invention furthermore has an insert 18 that forms the entire bowl wall 15b as well as the bowl edge region 15c of combustion bowl 15, and furthermore part of the piston crown 12, in the embodiment shown. Insert 18 preferably consists of a particularly high-strength material. For this purpose, a steel that is resistant to high elevated temperatures, corrosion-resistant, and heat-resistant is particularly suitable. Valve steels such as, for example, CrSi steel (X45CrSi93), Chromo193 steel (X85CrMoV182), 21-4 N steel (X53CrMnNiN219), 21-2 steel (X55CrMnNiN208), Nimonic80A steel (NiCr20TiAl), ResisTEL steel, or VMS-513 steel, are particularly suitable.

Piston base body 11 and insert 18 form a circumferential outer cooling channel 19. Cooling channel 19 runs at the level of the ring belt 14, and at the level of the bowl wall 15b of the combustion bowl 15. Cooling channel 19 has a cooling channel bottom 19a, a cooling channel ceiling 19b, an outer side wall 19c, and an inner side wall 19d. Cooling channel bottom 19a and outer side wall 19c are formed by piston base body 11 in this exemplary embodiment. Inner side wall 19d is formed by insert 18, while cooling channel ceiling 19b is formed jointly by piston base body 11 and by insert 18.

Insert 18 has a lower circumferential joining surface that forms a lower weld seam 21 with a circumferential joining surface on piston base body 11 that encloses bottom 15a of the combustion bowl 15. Lower weld seam 21 has a length of 3.5% to 5.5% of piston diameter D, and encloses an acute angle α with a piston center axis M. The lower weld seam 21 therefore runs radially toward the outside, proceeding from bowl wall 15b, and downward (in the direction of the piston skirt 17), and ends in cooling channel 19, in the region of cooling channel bottom 19a. In this region of piston 10, the lowest stresses in the material occur during engine operation, so that the risk of crack formation in the region of weld seam 21 is minimized.

Insert 18 furthermore has an upper circumferential joining surface that forms an upper weld seam 22 with a circumferential joining surface on piston base body 11, in the region of top land 13. Upper weld seam 22 has a length of 4.5% to 6.0% of the piston diameter D. Upper weld seam 22 runs from the cooling channel ceiling 19b to piston crown 12 and parallel to piston center axis M, and encloses an acute angle β with lower weld seam 21. Upper weld seam 22 is disposed centered with reference to the clear width W of cooling channel 19 (see FIG. 3). According to the invention, upper weld seam 22 is therefore disposed far enough away from bowl edge region 15c so that the risk of crack formation due to thermal and mechanical stresses in the region of weld seam 22 is reduced. In this region of piston crown 12, in which upper weld seam 22 is disposed, comparatively low stresses in the material occur during engine operation.

Figure 3:
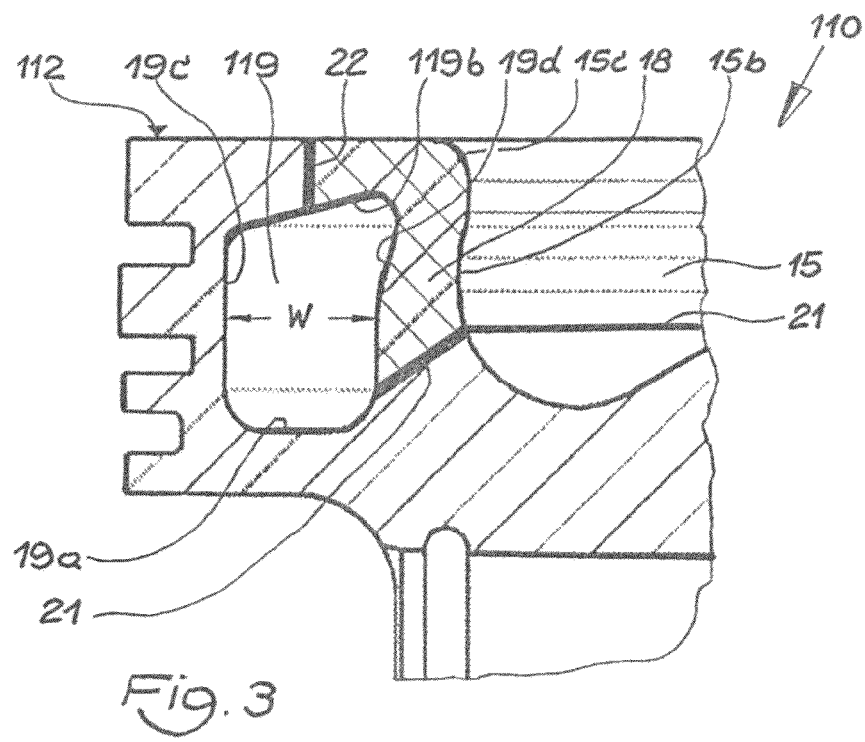
FIG. 3 shows a sectional detail view of another embodiment of a piston according to the invention.

FIG. 3, in a detail view, shows another embodiment of a piston 110 according to the invention. Piston 110 differs from piston 10 according to FIGS. 1 and 2 only in that the thickness of piston crown 112 increases radially toward the outside in the region of cooling channel 119. The cooling channel ceiling 119b of cooling channel 119 therefore extends radially outward and downward (in the direction of the piston skirt 17).

Figure 4:
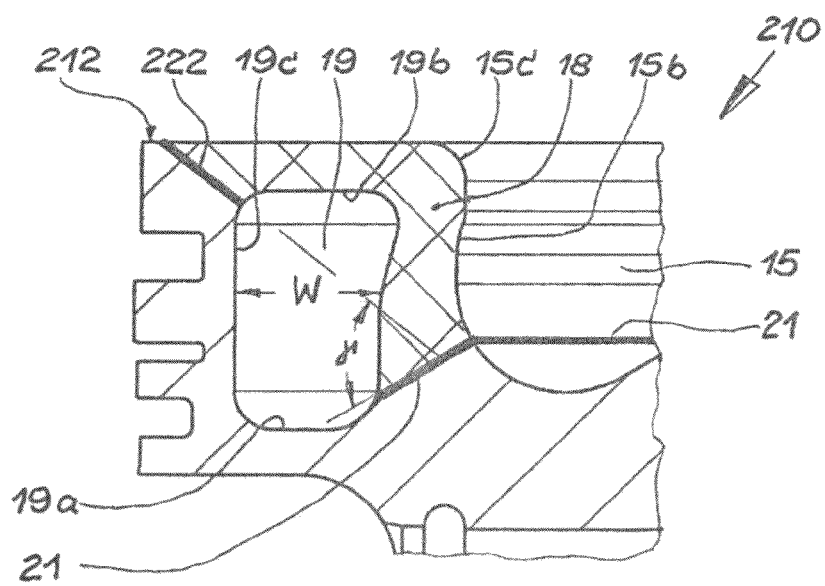
FIG. 4 shows a detail view of another exemplary embodiment of a piston according to the invention, in a representation corresponding to FIG. 3.

FIG. 4, in a detail view comparable to FIG. 3, shows another embodiment of a piston 210 according to the invention. Piston 210 differs from piston 10 according to FIGS. 1 and 2 only in that upper weld seam 222 is disposed in the region of top land 13, and runs at a slant, namely proceeding from the outer edge of piston crown 12 radially toward the inside and downward (in the direction of the piston skirt 17). Upper weld seam 222 ends in cooling channel 19, between cooling channel ceiling 19b and outer side wall 19c. Upper weld seam 222 and lower weld seam 21 enclose an acute angle γ.

Piston base body 11 and insert 18 are connected with one another in known manner, by means of beam welding, particularly preferably by means of laser welding. Typically, piston base body 11 and insert 18 are pre-worked in known manner. In particular, the joining surfaces are cleaned and smoothed. Then, piston base body 11 and insert 18 are joined together, for example by means of press fit. In a next step, weld seams 21, 22, 222 can be tacked, at certain points or circumferentially at a low welding depth. Then piston 10, 110, 210 is heated to a temperature of 400° C. to 550° C. Thereupon weld seams 21, 22, 222 are welded through. Finally, piston 10, 110, 210 is finished, by machining it after it has cooled, in known manner.

Accordingly, while only a few embodiments of the present invention have been shown and described, it is obvious that many changes and modifications may be made thereunto without departing from the spirit and scope of the invention.

What is claimed is:

1. A piston for an internal combustion engine, comprising a piston head that has a closed circumferential cooling channel as well as a combustion bowl with a circumferential bowl wall that makes a transition into a piston crown by way of a bowl edge region, wherein the combustion bowl is formed at least in part by a piston base body and the bowl wall is formed at least in part from an insert, wherein the insert is connected with the piston base body by beam welding, wherein a lower weld seam is configured in the bowl wall, which seam encloses an acute angle with a piston center axis (M) and ends in a lower half of the cooling channel, and wherein an upper weld seam runs from a cooling channel ceiling to the piston crown and is disposed centered or radially offset toward an outside, with reference to a clear width (W) of the cooling channel, and wherein the lower weld seam and the upper weld seam enclose an acute angle.

2. The piston according to claim 1, wherein the piston base body and the insert are connected with one another by laser welding.

3. The piston according to claim 1, wherein the lower weld seam ends in the cooling channel, in a region of a cooling channel bottom.

4. The piston according to claim 1, wherein the lower weld seam has a length of 3.5% to 5.5% of a piston diameter.

5. The piston according to claim 1, wherein the upper weld seam runs parallel to a piston center axis.

6. The piston according to claim 1, wherein the upper weld seam has a length of 4.5% to 6.0% of a piston diameter.

7. The piston according to claim 1, wherein a thickness of the piston crown increases radially toward the outside above the cooling channel.

8. The piston according to claim 1, wherein the entire bowl wall is formed from the insert.

9. The piston according to claim 1, wherein the piston base body and the insert consist of different materials.

10. The piston according to claim 1, wherein the insert consists of a valve steel that is high temperature-resistant and corrosion-resistant.

\* \* \* \* \*